United States Patent [19]

Cahill

[11] Patent Number: 4,668,093
[45] Date of Patent: May 26, 1987

[54] OPTICAL GRATING DEMODULATOR AND SENSOR SYSTEM

[75] Inventor: Richard F. Cahill, El Toro, Calif.

[73] Assignee: McDonnell Douglas Corporation, Long Beach, Calif.

[21] Appl. No.: 503,549

[22] Filed: Jun. 13, 1983

[51] Int. Cl.[4] .............................................. G01B 9/02
[52] U.S. Cl. .................................. 356/345; 250/227; 250/237 G
[58] Field of Search ............... 356/345, 356, 357, 358; 250/227, 237 G, 550

[56] References Cited

U.S. PATENT DOCUMENTS

| | | | |
|---|---|---|---|
| 2,846,919 | 8/1958 | Thompson | 356/358 X |
| 2,848,921 | 8/1958 | Koulikovitch | 356/357 |
| 3,983,390 | 9/1976 | Llop | 250/237 G X |
| 4,039,826 | 8/1977 | Wingate | 250/237 G |

OTHER PUBLICATIONS

Giallorenzi et al. "Optical Fiber Sensor Technology", IEEE J. Quant. Electron., vol. QE-18, No. 4, p. 654, Apr. 1982.

Primary Examiner—Davis L. Willis
Assistant Examiner—Matthew W. Koren
Attorney, Agent, or Firm—George W Finch; Donald L. Royer; John P. Scholl

[57] ABSTRACT

The demodulator system includes a source of light, and a beamsplitter which produces mutually coherent sensor and reference beams through sensor and reference fibers respectively, the sensor fiber being exposed to the effect to be sensed while the reference fiber is isolated therefrom. A ferrule maintains the output ends of the sensor and reference fibers in fixed positions with respect to a combiner lens which collimates the sensor and reference beams to form an interference pattern on a quad detector through a quad grating. The quad grating has four quadrants lined with the spacing of the interference pattern produced by mixing of the sensor and reference beams but positioned 0°, +90°, −90°, and 180° apart in phase, $\phi$. Therefore the quad detector produces outputs which contain +sine $\phi$, −sine $\phi$, +cosine $\phi$, and −cosine $\phi$ of the phase change between the sensor and reference beams due to changes in the effective optical path length difference between the reference and sensor fibers. These signals are then electronically converted into an electrical output which linearly represents the phase of the signal originally impressed on the sensor fiber.

37 Claims, 14 Drawing Figures

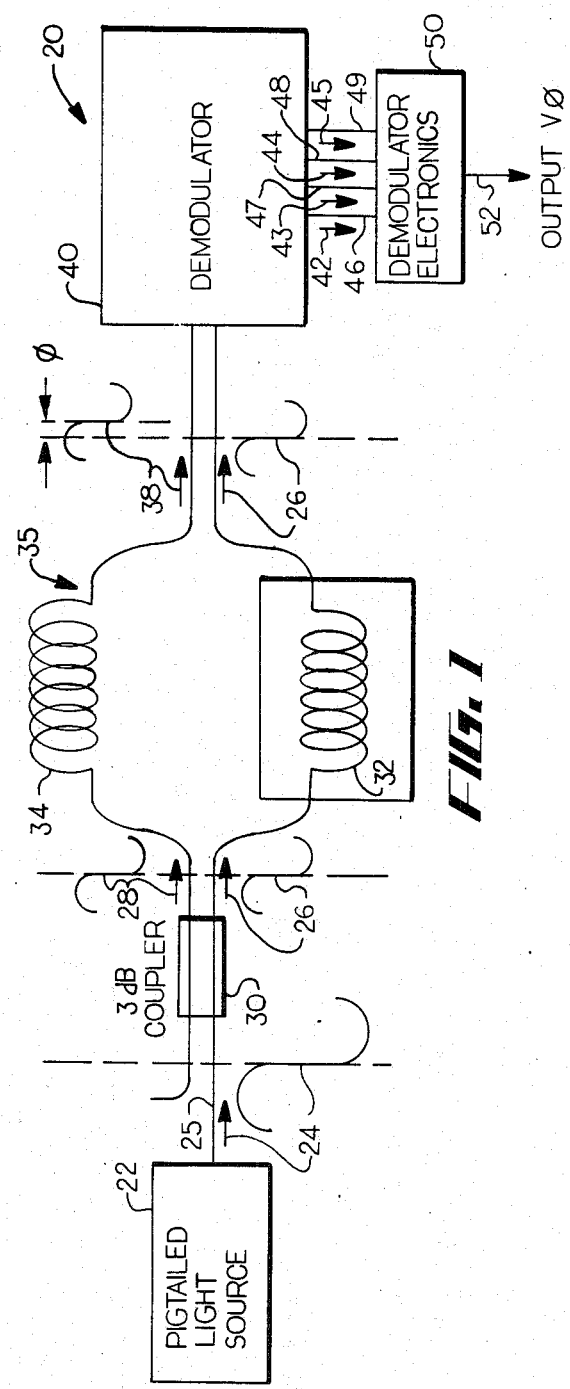
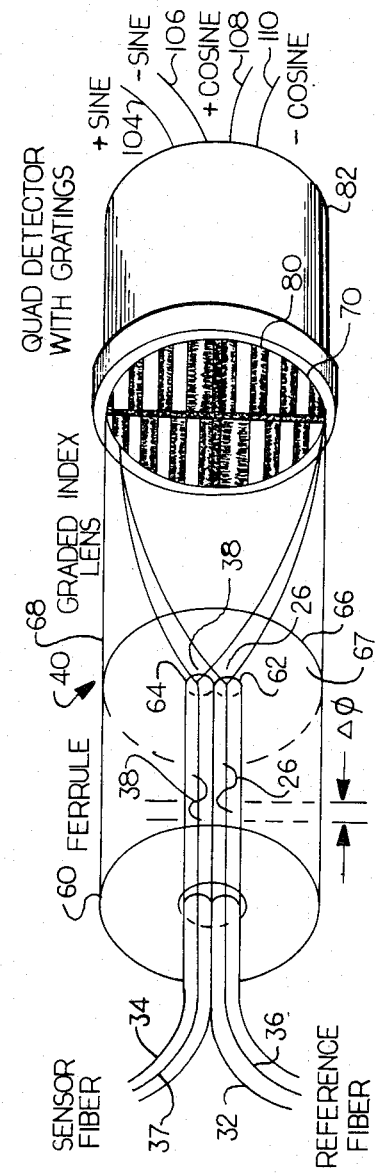

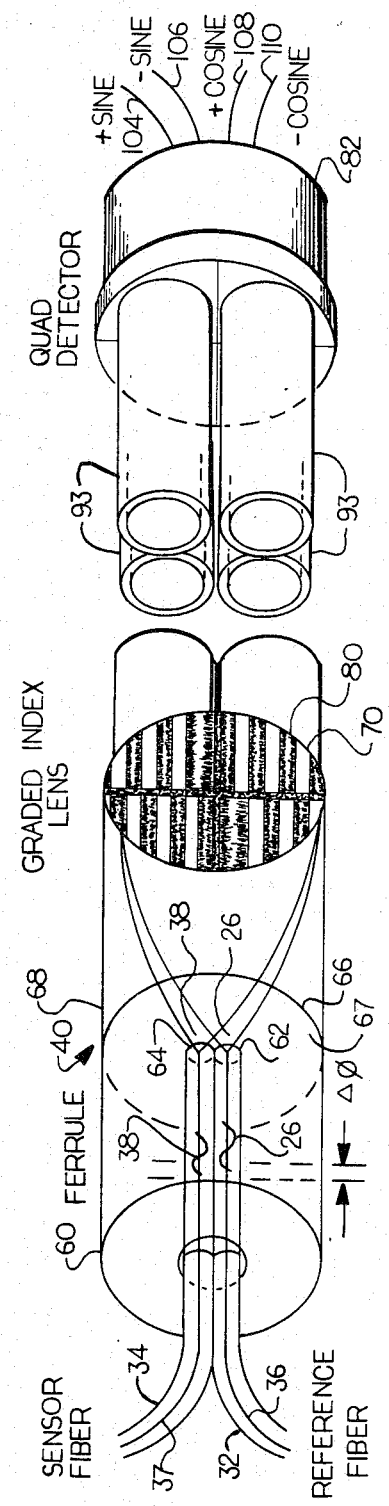

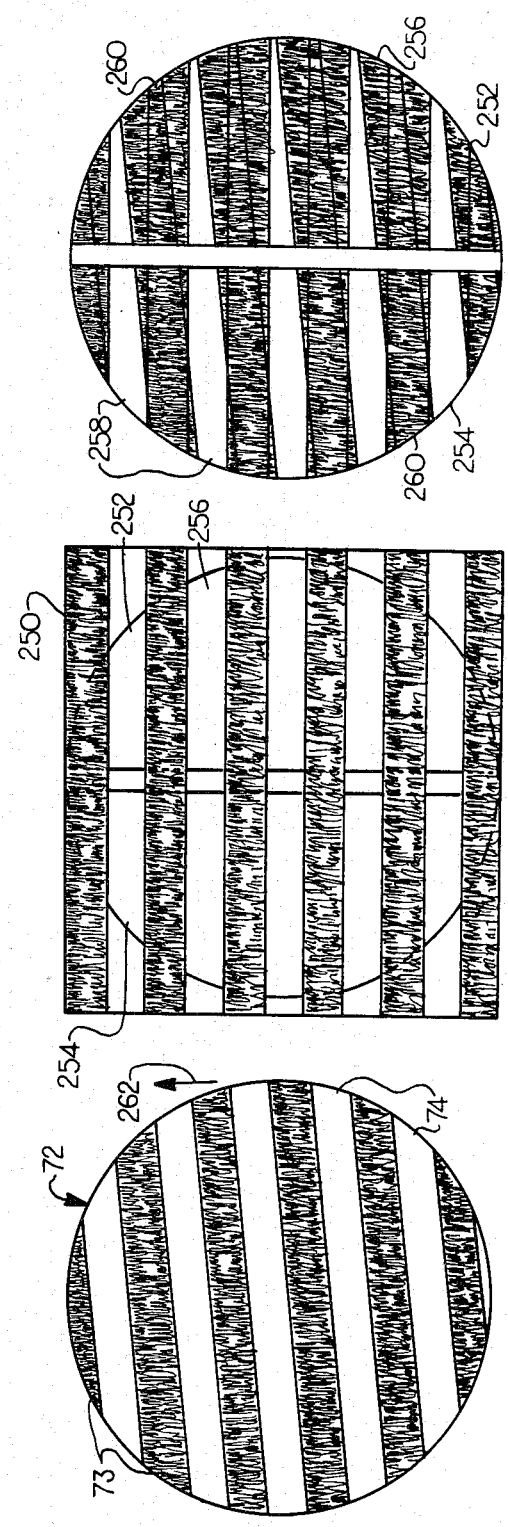

OPTICAL GRATING DEMODULATOR AND SENSOR SYSTEM

CROSS-REFERENCE TO RELATED PATENT APPLICATION

This case is related to U.S. patent application Ser. No. 225,731, now U.S. Pat. No. 4,375,680, by Richard F. Cahill and Eric Udd filed Jan. 16, 1981 and entitled "Acoustic Sensor" and U.S. Pat. Ser. No. 309,254, now U.S. Pat. No. 4,588,296, filed Oct. 7, 1981 by Richard F. Cahill and Eric Udd entitled "Improved Optical Gyro" both of which are assigned to Applicant's assignee. The teachings of those applications are hereby incorporated by reference as though fully set forth herein below.

BACKGROUND OF THE INVENTION

Extremely sensitive low cost acoustic sensors are required for a wide range of applications, many of which involve operation under hostile environments. A typical example is a geophone used to record the response of the earth to acoustic impulses applied thereto in the search for minerals and petroleum both on land and under water. It has been recognized that fiber optics may allow the construction of rugged high performance microphones. In particular, approaches have been developed successfully which are based on the comparison of light passed through a reference optical fiber shielded from acoustic noise with light passed through a second sensor fiber which is subjected to the acoustic energy wished to be detected. One such approach is reported in U.S. Pat. No. 4,297,887 entitled "High-Sensitivity, Low-Noise, Remote Optical Fiber" by J. A. Bucaro. Unfortunately, such devices are not always able to provide features and desirable attributes such as automatic noise suppression, low cost, small size, simple design, and ease of incorporation in acoustic sensor arrays. These and other more sensitive devices, such as taught by Cahill and Udd in U.S. patent application Ser. No. 225,731, require electronic feedback mechanisms for readout and signal stabilization.

BRIEF DESCRIPTION OF THE PRESENT INVENTION

The present demodulator system includes a source of light, and a beamsplitter which produces mutually coherent sensor and reference beams. The sensor and reference beams are transmitted through sensor and reference fibers respectively, the sensor fiber being exposed to the effect to be sensed while the reference fiber is isolated therefrom but otherwise subjected to the same environment so that any relative changes in length therebetween are the result of signal energy to be detected impinging on the sensor fiber. The output ends of the sensor and reference fibers are maintained in fixed positions at the focal point of a combiner lens by being encapsulated in a ferrule. The combiner lens preferably is a one quarter pitch graded index lens of the proper physical length and focal length to produce two overlapping collimated beams, with a slight angle between them, and to combine both beams into an interference pattern on its opposite side surface. The transverse position of the alternate bands of light and dark of the interference pattern are indicative of the phase difference between the two beams, while the spacing of the bands is dependent on the characteristics of the lens, the positioning of the output ends of the fibers and the wavelength of the beams. A suitable lens is available from the Nippon Sheet Glass Co. and is known as a Selfoc lens. This interference pattern is detected by a quad detector through a quad grating. The quad grating has four quadrants, each aligned with a detector quadrant of the quad detector. The quadrants of the quad grating are lined with the spacing of the interference pattern produced by mixing of the sensor and reference beams when they are respectively 0°, +90°, −90°, and 180° apart in phase. Therefore the quad detector produces electrical outputs which are proportional to the sine and cosine of the ± phase change between the sensor and reference beams due to changes in the effective optical path length difference of the reference and sensor fibers. These signals are then electronically converted into an electrical output which linearly represents the phase of the signal originally impressed on the sensor fiber. If desired the sensor and reference fibers can be extended to a location which is relatively environmentally secure before the light beams are converted into the electrical output signals to avoid electromagnetic interference. The electrical signals can be operated on by various means to achieve desired information thereafter.

The optical grating demodulator approach is a technique that allows high performance sensing to be achieved in an extremely small volume without electronic feedback, greatly simplifying construction, operation and maintenance requirements. Use of the present demodulator allows the formation of sensor arrays that are entirely optical since the signals, which are to be detected, are impressed upon a light beam that is one of the inputs to the demodulator and the output signal can also be carried on light beams. The sensor is arranged optically so that sensitivity is maximized and signal dropout, due to environmental effects, such as temperature, do not occur. It also has the advantage of significant cost savings due to reduced electronics cost as well as reduced sensitivity to electromagnetic effects.

The end result is a highly sensitive, tiny, sensor system which can be incorporated in large arrays and which can use light to transmit sensed information out of a region in a stable form for further processing in a more friendly environment.

It is therefore an object of the present invention to provide a sensor system of high sensitivity which requires no electronic feedback mechanisms for readout and signal stablization.

Another object is to provide an acoustic sensor having a performance level compatible with many sophisticated applications such as seismic exploration and underwater towed arrays.

Another object is to provide an optical sensor system in which a major amount of signal processing occurs before conversion to electronic signals.

Another object is to provide a sensor system which can be made relatively insensitive to environmental effects such as temperature or electromagnetic fields.

Another object is to provide a high quality optical demodulator which is economic to construct, has a very small size, and which can be incorporated into large arrays.

These and other objects and advantages of the present invention will become apparent to those skilled in the art after considering the following detailed specification which covers preferred embodiments thereof in conjunction with the accompanying drawings wherein:

BRIEF DESCRIPTION OF THE DRAWINGS

FIG. 1 is a block diagram of a optical grating acoustics sensor system constructed according to the present invention;

FIG. 2 is an enlarged perspective view of the demodulator optics for the system of FIG. 1;

FIG. 2A is an enlarged perspective view of a modified version of the demodulator optics of FIG. 2;

FIG. 8 is an elevational view of a modified grating suitable for use in the system of FIG. 1;

FIG. 9 is a diagram of the interference pattern produced when a signal is being sensed with the system of FIG. 1 arranged to be slightly skewed from the grating pattern of the grating of FIG. 8;

FIG. 10 is a view of the light and shadows thrown on a two-segment light detector by the grating of FIG. 8 and the interference pattern of FIG. 9 oriented as shown;

DETAILED DESCRIPTION OF THE SHOWN EMBODIMENTS

Figures 3, 4, 5:
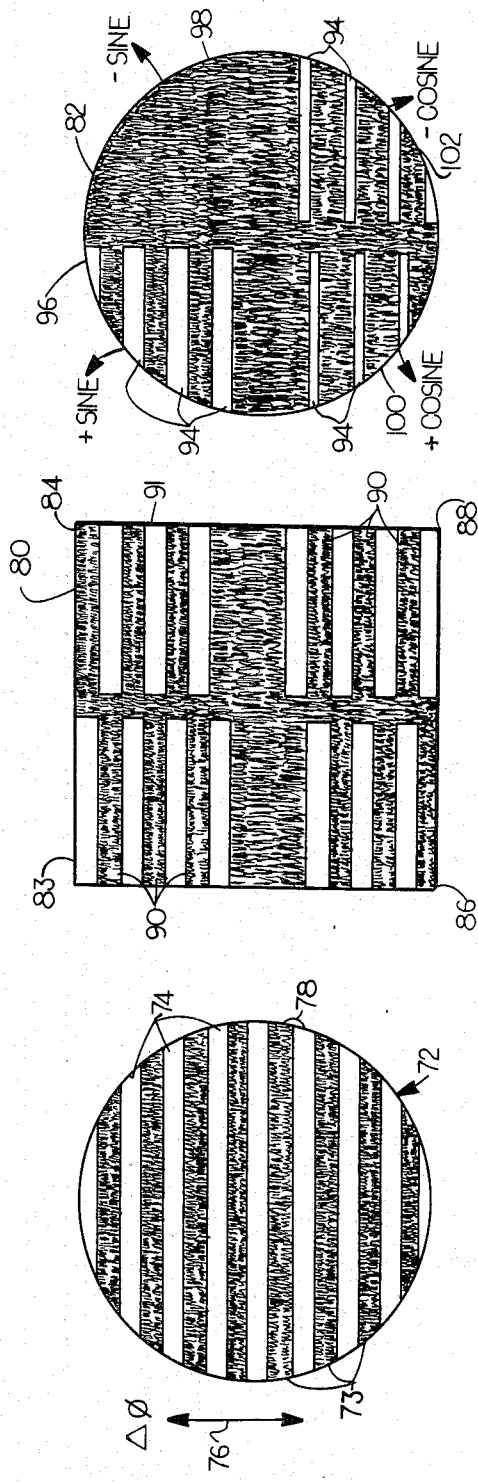
FIG. 3 is a diagram of the interference pattern produced when a signal is being sensed with the system of FIG. 1.
FIG. 4 is an elevational view of the grating of the system of FIG. 1.
FIG. 5 is a diagram of the light striking the detector of FIG. 1 after the interference pattern of FIG. 3 has passed through the grating of FIG. 4.

Referring to the drawings, more particularly by reference numbers, number 20 in FIG. 1 refers to a fiber optic interferometric sensor system which for purposes of discussion is shown as an acoustic sensor system. The system 20 includes a source 22 for producing a coherent light beam 24. The source 22 may be a laser diode, superradiant diode, light emitting diode, narrow-band filtered white light source or any other device which can produce a relatively narrow band of wavelengths of light of relatively stable amplitude and wavelength. The beam 24 is transmitted by means of an optical fiber 25 and is split into a reference beam 26 and a sensor beam 28 by a beamsplitter, shown as a 3dB coupler 30. The reference beam 26 is propagated through a reference fiber 32 which is acoustically isolated. The sensor beam 28 propagates through a sensor fiber 34 which is acoustically insonofied so that an acoustic interferometer 35 is formed. Both fibers 32 and 34 are single-mode fibers with tiny central cores 36 and 37 preferably are the same length, preferably physically identical, and exposed to the same environment. By havin9 both fibers 32 and 34 exposed to the same environment except for acoustic signals, other environmental effects which are not to be sensed are impressed on both beams 26 and 28 identically and are cancelled out when the phase differences of the beams 26 and 28 are detected. If identical fibers and environments are not present, then other means may be required to separate the desired signal from the unwanted environmental effects, such as a low frequency cutoff at the demodulator electronics to remove low frequency thermally induced fluctuations. The beam 28 is phase modulated into beam 38 by passage through the fiber 34 which thereafter includes phase variations indicative of the acoustic signals impressed on the sensor fiber 34. This phase-shifted beam 38 and the reference beam 26 are passed to demodulator optics 40 by the fibers 34 and 32.

The optics 40 are used to convert the beams 38 and 26 into electrical signals 42, 43, 44, and 45 which are $+$sine $\phi$, $-$sine $\phi$, $+$cosine $\phi$, and $-$cosine $\phi$ (all with a DC offset) where $\phi$ is the phase change due to the instantaneous optical path length difference between the reference fiber 32 and the sensor fiber 34. The electrical signals 42, 43, 44, and 45 are passed by means of lines 46, 47, 48, and 49 to demodulator electronics 50 which convert electrical signals 42, 43, 44, and 45 into an output $\phi_A$ on the electrical output line 52 of the demodulator electronics 50. The output $\phi_A$ is the phase difference caused by the acoustic signal impressed on the sensor fiber 34.

The demodulator optics 40 are shown in detail in FIG. 2. The reference fiber 32 and the sensor fiber 34 are terminated in a ferrule 60 with their output ends 62 and 64 co-planar with the end surface 66 of the ferrule 60. The beams 26 and 38 project into the input end 67 of a one-quarter pitch graded index lens 68 whose length and index gradient are proper to bring the beams 26 and 38 into focus at the opposite end 70 of the lens 68. When the fiber ends 62 and 64 are in vertical alignment as shown, this produces an interference pattern 72 (FIG. 3) which consists of horizontal alternate darker and lighter areas 73 and 74 of equal width which move at 90° to their long dimension, as shown by the arrow 76, in response to the changing phase between the beams 38 and 26. Changing $\Delta\phi$ by $2\pi$ radians (360°) moves the pattern by one cycle, which is the width of one line pair 78. Although difficult to show in the drawings, the intensity of the light in the areas 73 and 74 varies sinusoidally above and below an average value of intensity equal to or larger than the peak value of the sinusoid, and with the width of a line pair 78 including the areas 73 and 74 being predetermined by the characteristics of the lens 68, the spacing of the fiber ends 62 and 64, and the frequency of the source 22.

The interference pattern 72 is projected through a grating 80 into a quad detector 82. The grating 80 as shown in FIG. 4, is divided into four sections 82, 84, 86 and 88 and includes opaque lines 90 of a width equal to ½ cycle of the sinusoidal variation of the line pair 78. Preferably, the lines 90 are photolithographed on a thin glass plate 91 and are positioned at different locations in each quadrant an amount equal to a shift in phase of 0°, 180°, $+$90°, and $-$90° of the pattern 72 so that in combination with the interference pattern 72 projecting therethrough, the resultant pattern 92 falling on the detector 82 has an average magnitude which equals the offset $+$sine $\phi$, $-$sine $\phi$, $+$cosine $\phi$, and $-$cosine $\phi$ respectively, $\phi$ being the phase difference between the beams 26 and 38. The offset is a constant having a value of at least 1 since light cannot have a negative amplitude. Alternatively, the lines 90 can be deposited on the surface of the quad detector 82 or on the quarter pitch graded index lens, with four multimode fibers 93 to conduct the light to the quad detector 82 located remotely, as in FIG. 2A. In FIG. 5, the effect of a phase difference of 90° is shown so that the magnitude of the light bars 94 falling on the first quadrant detector 96 of the detector 82 is 1, which is the relative magnitude of the offset plus the sine of 90° whereas the magnitude of the light bars 94 falling on the second quadrant detector 98 is 0, which is the relative magnitude of the offset minus the sine of 90°. The third quadrant detector 100 is receiving light of 0.5 magnitude representative of the offset plus the cosine of 90° as is the fourth quadrant detector 102 representative of the offset minus the cosine of 90°. The detectors 96, 98, 100 and 102 change the light input thereto into electrical signals on lines 104, 106, 108 and 110 respectively for further processing. If the optics are balanced, essentially the same signal is produced at the detectors 96, 98, 100, and 102. however, it is shifted in phase 0°, 180°, +90° and −90°, respectively.

Figure 6:
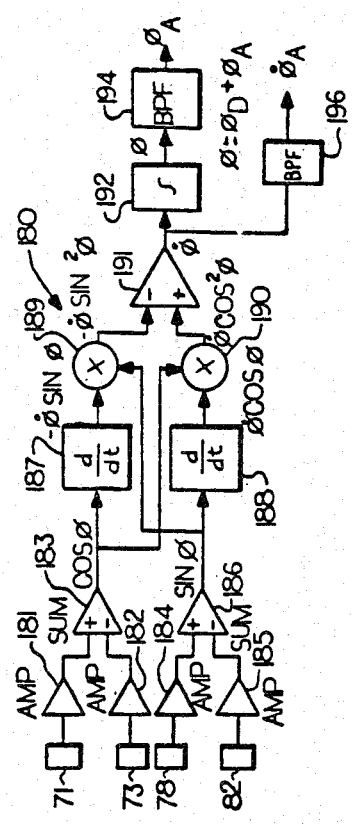
FIGS. 6 and 7 are diagrams of electronic devices to process the optical sine and cosine output signals from the optical grating demodulator into an electrical signal representative of the phase difference between input signals to the demodulator.
Figure 7:
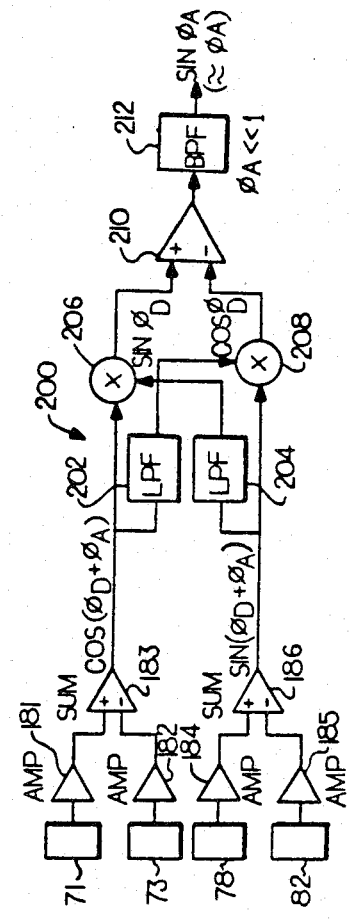

Two electronic methods to process the offset sine and cosine output signals from the optical demodulator 40 are shown in FIGS. 6 and 7. In the electronic circuit 180 shown in FIG. 6, the outputs of the detectors 71 and 73 are amplified in amplifiers 181 and 182 and differenced in summer 183 to produce sin $\phi$. Detectors 78 and 82 are amplified in amplifiers 184 and 185 and differenced in summer 186 to produce cos $\phi$. The time derivatives of the cosine and sine signals out of the two summing devices 183 and 186 are produced by differentiators 187 and 188. The time derivative output signal is then multiplied by the alternate, undifferentiated signal in multipliers 189 and 190. The outputs of the multipliers 189 and 190 are differenced in a summing amplifier 191 whose output, $d\phi/dt$ is integrated by an integrator 192 to produce the desired phase shift $\phi$ as a function of time within the pass band, specified by passing the unfiltered signal $\phi$ through a high bandpass filter 194 which removes the low frequency phase shift $\phi_D$ leaving the acoustic phase shift $\phi_A$. Alternately, the output of the summing amplifier 191, $d\phi/dt$, may also be filtered by a bandpass filter 196 to produce $d\phi_A/dt$.

In the circuit 200 of FIG. 7, the outputs from the detectors 71 and 73 and 78 and 82 are filtered by low pass filters 202 and 204 and then multiplied by the unfiltered alternate signal in multipliers 206 and 208. The outputs of the multipliers 206 and 208 are then differenced in a summing amplifier 210 and passed thru a bandpass filter 212 to produce sin $\phi_A$ which closely approximates the desired phase shift when $\phi_A$ when $\phi_A$ is much less than 1.

If lesser performance is required, a simple demodulator having the grading 250 shown in FIG. 8 can be employed with a detector 252 having two light sensitive segments 254 and 256 which produce electrical signals in response to the light impinging thereon. When the interference pattern 72 is slightly canted as shown in FIG. 9 and then projected through the grating 250, a pattern of light areas 258 and dark areas 260 appear on the detector 252. Assuming that the movement of the interference pattern 72 in the direction of arrow 262 is positive, for the positioning of the pattern, the light hitting the segment 254 represents the offset sine 90°, which is the maximum amount of light that will ever strike that segment 254 whereas the light on the segment 256 is half the light that will strike that segment 256 representing the offset cosine 90°. The proper angle of cant depends on the width and detector size but can be determined experimentally by moving the pattern vertically so that maximum and minimum values are produced on one segment and then varying the angle until the maximum or minimal value on the other segment occurs when the pattern is moved one half the distance. Thereafter, the outputs of the detector 252 are functions of sin $\phi_A$ and the cos $\phi_A$ which signals can be transmitted to the amplifiers 181 and 184 respectively of either of the circuits shown in FIGS. 6 and 7 to produce the desired output, $\phi_A$. It should be realized that by simplifying the construction, the chances of error due to mismatch or misalignment increase. However, in applications where cost rather than accuracy is of primary concern, the grating 250 with its associated two segment detector 252 may be preferable to the more complex grating 80 and quad detector 82 of FIGS. 2 and 2A.

Figure 11:
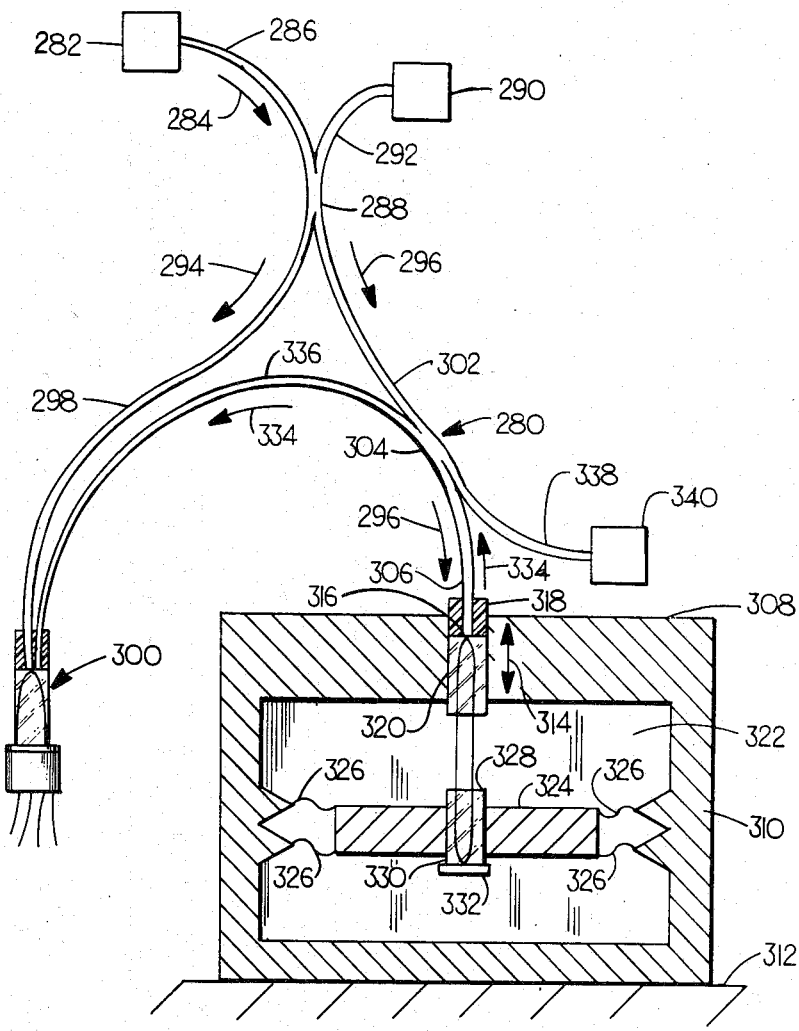
FIG. 11 is a diagrammatic representation of a seismic sensor system employing the present invention.

A typical application of a demodulator constructed according to the present invention is shown in the system 280 of FIG. 11. The system 280 includes a light source 282 which provides a light beam 284 of a predetermined coherence through an optical fiber 286 to a coupler 288. An alternate light source 290 may be provided on fiber 292 which forms the opposite input leg of the coupler 288. The alternate light source 290 can be used to provide a backup in case of failure of the primary light source 282. The light beam 284 is split by the coupler 288 into beams 294 and 296 with beam 294 being transmitted through an optical fiber 298 as the reference beam for detector 300 which may be constructed as shown in FIGS. 2, 2A or FIGS. 8 through 10. The beam 296 passes down fiber 302 as an input to coupler 304 having a leg 306 connected to a seizmic sensor 308.

The sensor 308 includes body 310 fixed to ground 312 by suitable means. This causes any movement of the ground 312 to be transferred to the body 310. As shown, the sensor 308 is sensitive to movement in the direction of the arrow 314.

The end 316 of the fiber 306 is held in a ferrule 318 which is matched with a quarter pitch graded index lens 320 to project the beam 296 into a central cavity 322 of the body 310. A mass 324 is supported within the cavity 322 by flexures 326 designed to allow relative movement between the mass 324 and the body 310 only in the direction of arrow 314. The mass 324 includes a cat's eye reflector 328 which can be constructed from a quarter pitch graded index lens 330 having a mirror 332 opposite the lens 320. The beam 296 reflects off of the mirror 332 and is returned back to the fiber 306 as beam 334 with a changes in phase representative of any relative motion between the mass 324 and the body 310 impressed thereupon. The beam 334 is the sensor beam in the previous discussions. Although Y couplers are available, four terminal couplers are shown in FIG. 11 with the unused end 338 of coupler 304 being blocked by an absorbing termination 340 which prevents back reflections.

Figure 12:
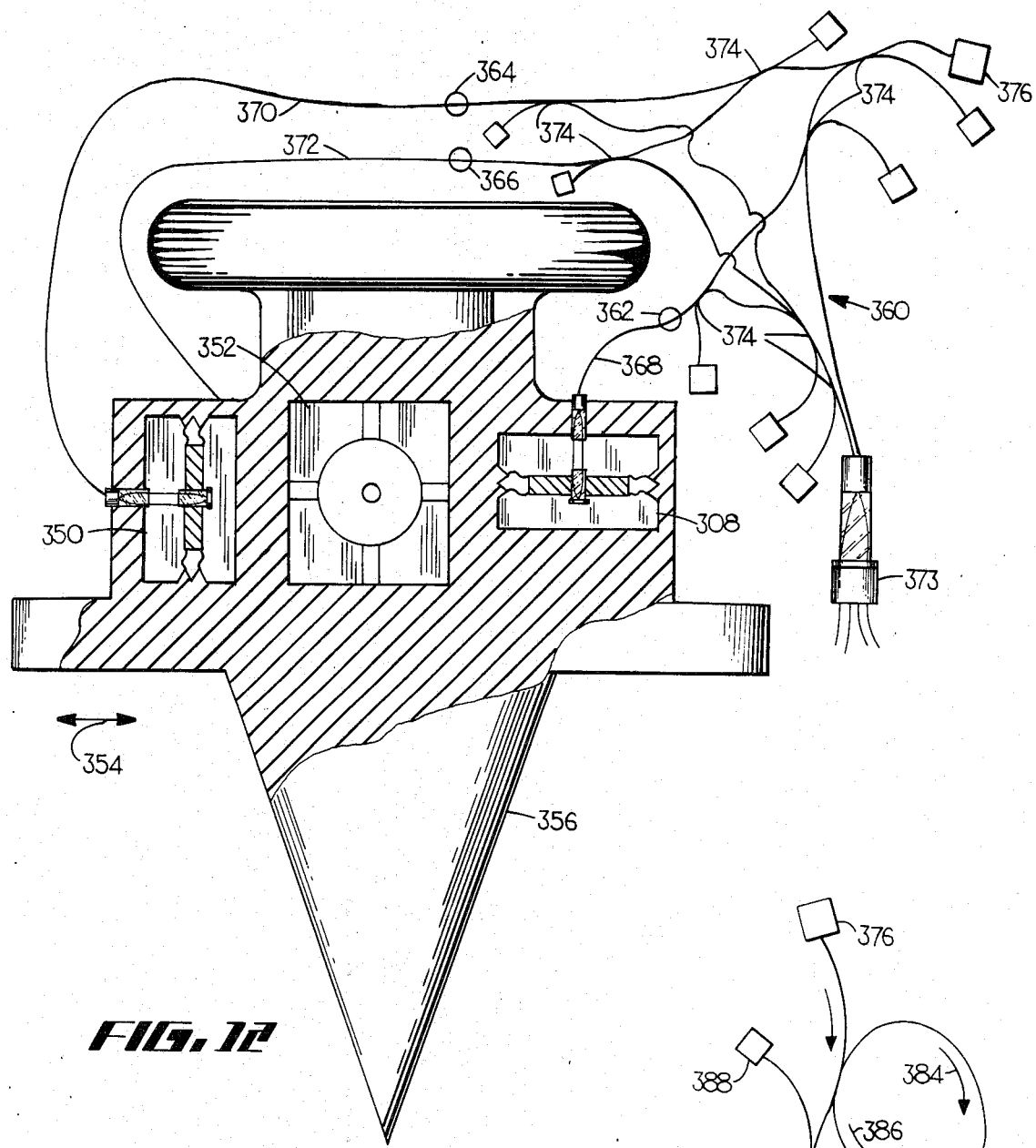
FIG. 12 is a three direction sensor system based upon the principles of FIG. 11.

Although the sensor 308 shown in FIG. 11 is sensing vertical motion of the ground 312, by proper orientation such sensors can be used sense motion of any orientation. For example, in FIG. 12, the vertical sensor 308 is combined with two similarly constructed sensors 350 and 352 with sensor 350 orientated to sense motion in the direction of arrow 354 and sensor 352 sensing motion in and out of the plane of the drawing. All three sensors, 308, 350, and 352, are mounted solidly to a ground spike 356 which is designed to be driven into the ground. The sensor system 360 supporting the sensors 308, 350, and 352, include PZT elements 362, 364 and 366 mounted on the connecting cables 368, 370 and 372 of the sensors 308, 350 and 352 to impress a frequency on the light beams passing therethrough. This allows the signal from each to be separate at the detector demodulator 373 to which they are connected. As before, the optical fibers of the system 360 are connected by four terminal couplers 374 which couple the light from the light source 376 to the sensors 308, 350 and 352 and to the demodulator 372 in essentially the same fashion as shown is FIG. 11.

Figure 13:
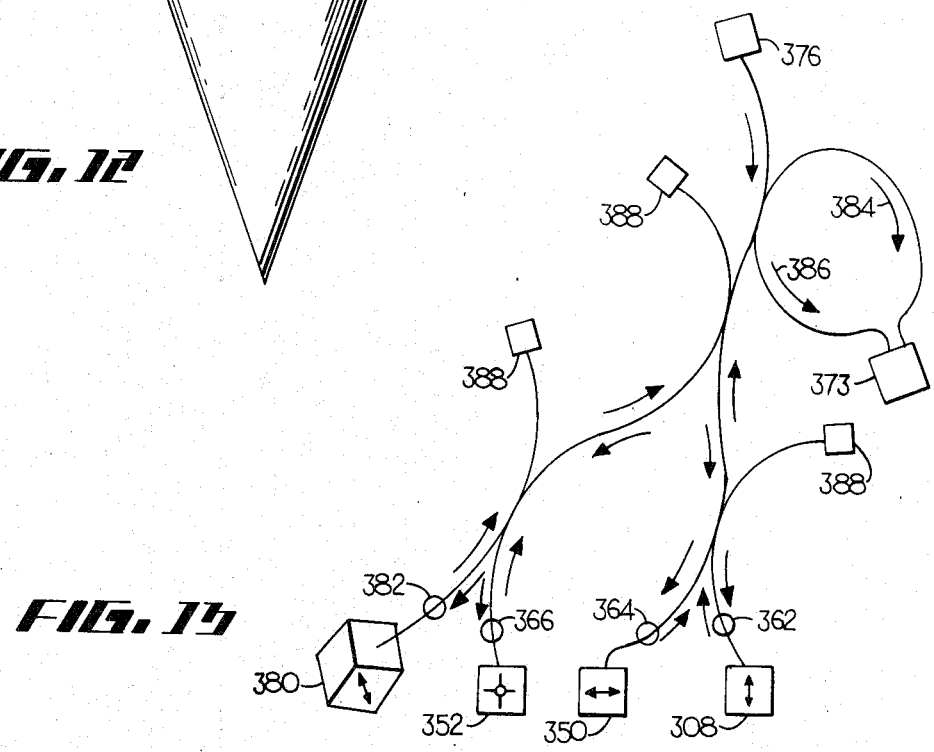
FIG. 13 is a diagrammatic representation of a four sensor system similar to those shown in FIGS. 11 and 12.

When using four terminal couplers or to keep a balanced system, three sensors are particular inconvenient. Therefore, in FIG. 13 a four sensor system is shown where sensors 308, 350 and 352 are joined by a fourth sensor 380 which is orientated to sense at 45° to the other three sensors, having its own PZT element 382 operating at a different frequency from elements 362, 364 and 366 so that all four sensor signals can be detected and distinguished in the sensor beam 384 at the detector 373 which also receives the reference signal 386 from the light source 376. As a system check, the signals from sensors 308, 350 and 352 combined should correlate to the signal from sensor 380. As before, all of the unused ends of the couplers are blocked by light absorbing terminations 388 to reduce back reflections within the system.

The system described is particularly suitable for usage in underwater towed arrays such as those of oil companies during underwater seismic exploration or for dry land sensing. Other applications include use with magnetic, magneto-optic, electric field, temperature, pressure and vibration sensors.

Since the signals representative of the sensed effect can remain in the optical domain for transmission to the optical grating demodulator 40, the present invention allows the deployment of highly sensitive acoustic sensors in arrays without electrical leads. This procedure has a number of advantages, including reduced electromagnetic interference, no need for electrical power in the array itself, and the capacity to be expanded into larger arrays.

Therefore there has been shown and described a novel optical grating demodulator and system which fulfills all the objects and advantages sought therefore. Many changes, alterations, modifications and other uses and applications of the subject invention will become apparent to those skilled in the art after considering this specification together with the accompanying drawings. All such changes, alterations and modifications which do not depart from the spirit and scope of the invention are deemed to be covered by the invention which is limited only by the claims which follow.

What is claimed is:

1. A sensor system using light as the sensing medium including:
    a reference light beam;
    a sensor light beam having the effect to be sensed impressed thereon in the form of phase changes, $\phi$, with respect to said reference light beam;
    means to mix said reference light beam and said sensor light beam into an interference pattern;
    first detector means positioned to have at least a portion of said interference pattern fall thereon;
    a first grating positioned optically between said means to mix said reference light beam and said sensor light beam into an interference pattern and said first detector means, said first grating being sized and aligned with respect to said interference pattern so that light from said interference pattern having an amplitude which is a function of $\sin \phi$ falls on said first detector means; a
    second detector means positioned to have at least a portion of said interference pattern fall thereon;
    third detector means positioned to have at least a portion of said interference pattern fall thereon;
    fourth detector means positioned to have at least a portion of said interference pattern fall thereon;
    a second grating positioned optically between said means to mix said reference light beam and said sensor light beam into an interference pattern and said second detector means, said second grating being sized and aligned with respect to said interference pattern so that light from said interference pattern having an amplitude which is a function of $-\sin \phi$ falls on said second detector means; said means
    a third grating positioned optically between said means to mix said reference light beam and said sensor light beam into an interference pattern and said third detector means, said third grating being sized and aligned with respect to said interference pattern so that light from said interference pattern having an amplitude which is a function of $\cos \phi$ falls on said third detector means;
    a fourth grating positioned optically between said means to mix said reference light beam and said sensor light beam into an interference pattern and said fourth detector means, said fourth grating being sized and aligned with respect to said interference pattern so that light from said interference pattern having an amplitude which is a function of $-\cos \phi$ falls on said fourth detector means; and
    a quad detector having:
        a front light receiving face. said quad detector including said first, second, third, and fourth detector means, wherein said first, second, third, and fourth gratings are formed on said front light receiving face of said quad detector.

2. The sensor system as defined in claim 1 wherein said means to mix said reference light beam and said sensor light beam include:
    a graded index lens having a pitch which is an odd number of quarter wavelengths of said reference beam, said graded index lens having:
    a front surface; and
    a back surface.

3. The sensor system as defined in claim 2 wherein said graded index lens back surface is positioned in contact with said first, second, third, and fourth gratings.

4. The sensor system as defined in claim 2 wherein said means to mix said reference light beam and said sensor light beam into an interference pattern include:
    a reference optical fiber for transmitting said reference light beam therethrough, said reference optical fiber having:
        an output face out through which said reference light beam is projected to said graded index lens; and
    a sensor optical fiber for transmitting said sensor light beam therethrough, said sensor optical fiber having:
        an output face out through which said sensor light beam is projected to said graded index lens to mix with said reference light beam and said sensor light beam, said reference light beam and said sensor light beam being projected from said output faces at locations on a predetermined line.

5. The sensor system as defined in claim 4 wherein said first, second, third, and fourth gratings have parallel grating lines which are perpendicular to said predetermined line.

6. A sensor system using light as the sensing medium including:
   a reference light beam;
   a sensor light beam having the effect to be sensed impressed thereon in the form of phase changes, $\phi$, with respect to said reference light beam;
   means to mix said reference light beam and said sensor light beam into an interference pattern;
   first detector means positioned to have at least a portion of said interference pattern fall thereon; and
   a first grating positioned optically between said means to mix said reference light beam and said sensor light beam into an interference pattern and said first detector means, said first grating being sized and aligned with respect to said interference pattern so that light from said interference pattern having an amplitude which is a function of sin $\phi$ falls on said first detector means, said means to mix said reference light beam and said sensor light beam including:
      a graded index lens having a pitch which is an odd number of quarter wavelengths of said reference beam, said graded index lens having:
         a front surface; and
         a back surface.

7. The sensor system as defined in claim 6 wherein said means to mix said reference light beam and said sensor light beam into an interference pattern further include:
   a reference optical fiber for transmitting said reference light beam therethrough, said reference optical fiber having:
      an output face out through which said reference light beam is projected to said graded index lens; and
   a sensor optical fiber for transmitting said sensor light beam therethrough, said sensor optical fiber having:
      an output face out through which said sensor light beam is projected to said graded index lens to mix with said reference light beam and said sensor light beam, said reference light beam and said sensor light beam being projected from said output faces at locations on a predetermined line.

8. The sensor system as defined in claim 7 wherein said first grating has parallel grating lines which are perpendicular to said predetermined line.

9. The sensor system as defined in claim 8 further including:
   second detector means positioned to have at least a portion of said interference pattern fall thereon;
   third detector means positioned to have at least a portion of said interference pattern fall thereon;
   fourth detector means positioned to have at least a portion of said interference pattern fall thereon;
   a second grating positioned optically between said means to mix said reference light beam and said sensor light beam into an interference pattern and said second detector means, said second grating being sized and aligned with respect to said interference pattern so that light from said interference pattern having an amplitude which is a function of $-\sin \phi$ falls on said second detector means;
   a third grating positioned optically between said means to mix said reference light beam and said sensor light beam into an interference pattern and said third detector means, said third grating being sized and aligned with respect to said interference pattern so that light from said interference pattern having an amplitude which is a function of $\cos \phi$ falls on said third detector means; and
   a fourth grating positioned optically between said means to mix said reference light beam and said sensor light beam into an interference pattern and said fourth detector means, said fourth grating being sized and aligned with respect to said interference pattern so that light from said interference pattern having an amplitude which is a function of $-\cos \phi$ falls on said fourth detector means.

10. The sensor system as defined in claim 9 wherein said first, second, third, and fourth gratings have parallel grating lines which are perpendicular to said predetermined line and parallel to said grating lines of said first grating.

11. The sensor system as defined in claim 9 wherein said means to mix said reference light beam and said sensor light beam include:
    a ferrule maintaining said output faces of said reference and sensor optical fibers on said predetermined line so that said reference and sensor beams project out therefrom with a predetermined spaced relationship to establish said interference pattern.

12. The sensor system as defined in claim 9 wherein said first detector means produce an electrical output which is $K+\sin \phi$ where K is a constant, said second detector means produce an electrical output which is $K-\sin \phi$, said third detector means produce an electrical output which is $K+\cos \phi$, and said fourth detector means produce an electrical output which is $K-\cos \phi$.

13. The sensor system as defined in claim 12 further including:
    electronic demodulator means connected to receive said $K+\sin \phi$, $K-\sin \phi$, $K+\cos 100$, and $K-\cos \phi$ signals from said first, second, third, and fourth demodulator means and to produce therefrom an electrical output signal $\phi$.

14. A sensor system using light as the sensing medium including:
    a reference light beam;
    a sensor light beam having the effect to be sensed impressed thereon in the form of phase changes, $\phi$, with respect to said reference light beam;
    means to mix said reference light beam and said sensor light beam into an interference pattern;
    first detector means positioned to have at least a portion of said interference pattern fall thereon;
    a first grating positioned optically between said means to mix said reference light beam and said sensor light beam into an interference pattern and said first detector means, said first grating being sized and aligned with respect to said interference pattern so that light from said interference pattern having an amplitude which is a function of sin $\phi$ falls on said first detector means;
    second detector means positioned to have at least a portion of said interference pattern fall thereon;
    third detector means positioned to have at least a portion of said interference pattern fall thereon;

fourth detector means positioned to have at least a portion of said interference pattern fall thereon;

a second grating positioned optically between said means to mix said reference light beam and said sensor light beam into an interference pattern and said second detector means, said second grating being sized and aligned with respect to said interference pattern so that light from said interference pattern having an amplitude which is a function of $-\sin \phi$ falls on said second detector means;

a third grating positioned optically between said means to mix said reference light beam and said sensor light beam into an interference pattern and said third detector means, said third grating being sized and aligned with respect to said interference pattern so that light from said interference pattern having an amplitude which is a function of $\cos \phi$ falls on said third detector means;

a fourth grating positioned optically between said means to mix said reference light beam and said sensor light beam into an interference pattern and said fourth detector means, said fourth grating being sized and aligned with respect to said interference pattern so that light from said interference pattern having an amplitude which is a function of $-\cos \phi$ falls on said fourth detector means;

a plate on which said first, second, third, and fourth gratings are formed;

a first optical fiber positioned to transmit light passing through said first grating on said transparent plate to said first detector means;

a second optical fiber positioned to transmit light passing through said second grating on said transparent plate to said second detector means;

a third optical fiber positioned to transmit light passing through said third grating on said transparent plate to said third detector means; and a fourth optical fiber positioned to transmit light passing through said fourth grating on said transparent plate to said fourth detector means.

15. A sensor system using light as the sensing medium including:

a reference light beam;

a sensor light beam having the effect to be sensed impressed thereon in the form of phase changes, $\phi$, with respect to said reference light beam;

means to mix said reference light beam and said sensor light beam into an interference pattern, said means to mix said reference light beam and said sensor light beam including:
a quarter pitch graded index lens;

first detector means positioned to have at least a portion of said interference pattern fall thereon;

a first grating positioned optically between said means to mix said reference light beam and said sensor light beam into an interference pattern and said first detector means, said first grating being sized and aligned with respect to said interference pattern so that light from said interference pattern having an amplitude which is a function of $\sin \phi$ falls on said first detector means.

16. A sensor system using light as the sensing medium including:

a reference light beam;

a sensor light beam having the effect to be sensed impressed thereon in the form of phase changes, $\phi$, with respect to said reference light beam;

means to mix said reference light beam and said sensor light beam into an interference pattern, said means to mix said reference light beam and said sensor light beam including:
a graded index lens having a pitch which is an odd number of quarter wavelengths of said reference beam;

first detector means positioned to have at least a portion of said interference pattern fall thereon;

a first grating positioned optically between said means to mix said reference light beam and said sensor light beam into an interference pattern and said first detector means, said first grating being sized and aligned with respect to said interference pattern so that light from said interference pattern having an amplitude which is a function of $\sin \phi$ falls on said first detector means.

17. A sensor system using light as the sensing medium including:

a reference light beam;

a sensor light beam having the effect to be sensed impressed thereon in the form of phase changes, $\phi$, with respect to said reference light beam;

means to mix said reference light beam and said sensor light beam into an interference pattern;

first detector means positioned to have at least a portion of said interference pattern fall thereon;

a first grating positioned optically between said means to mix said reference light beam and said sensor light beam into an interference pattern and said first detector means, said first grating being sized and aligned with respect to said interference pattern so that light from said interference pattern having an amplitude which is a function of $\sin \phi$ falls on said first detector means;

second detector means positioned to have at least a portion of said interference pattern fall thereon;

third detector means positioned to have at least a portion of said interference pattern fall thereon;

fourth detector means positioned to have at least a portion of said interference pattern fall thereon;

a second grating positioned optically between said means to mix said reference light beam and said sensor light beam into an interference pattern and said second detector means, said second grating being sized and aligned with respect to said interference pattern so that light from said interference pattern having an amplitude which is a function of $-\sin \phi$ falls on said second detector means;

a third grating positioned optically between said means to mix said reference light beam and said sensor light beam into an interference pattern and said third detector means, said third grating being sized and aligned with respect to said interference pattern so that light from said interference pattern having an amplitude which is a function of $\cos \phi$ falls on said third detector means; and a fourth grating positioned optically between said means to mix said reference light beam and said sensor light beam into an interference pattern and said fourth detector means, said fourth grating being sized and aligned with respect to said interference pattern so that light from said interference pattern having an amplitude which is a function of $-\cos \phi$ falls on said fourth detector means, wherein said light from said interference pattern falling on said first detector means has an amplitude $K+\sin \phi$ where K is a constant of a magnitude of at least 1, wherein said light from said interference pattern falling on said second detector means has an amplitude K−sin $\phi$, wherein said light from said interference pattern falling on said third detector means has an amplitude K+cos $\phi$, and wherein said light from said interference pattern falling on said fourth detector means has an amplitude K−cos $\phi$.

18. A sensor system using light as the sensing medium including:
  a reference light beam;
  a sensor light beam having the effect to be sensed impressed thereon in the form of phase changes, $\phi$, with respect to said reference light beam;
  means to mix said reference light beam and said sensor light beam into an interference pattern;
  first detector means positioned to have at least a portion of said interference pattern fall thereon; and
  a first grating positioned optically between said means to mix said reference light beam and said sensor light beam into an interference pattern and said first detector means, said first grating being sized and aligned with respect to said interference pattern so that light from said interference pattern having an amplitude which is a function of sin $\phi$ falls on said first detector means, wherein said means to mix said reference light beam and said sensor light beam into an interference pattern include:
    a graded index lens having a pitch which is an odd number of quarter wavelengths of said reference beam, said graded index lens having:
      a front surface; and
      a back surface;
  a reference single-mode optical fiber for transmitting said reference light beam therethrough, said reference single-mode optical fiber having:
    a tiny central core; and
    an output face out through which said reference light beam is projected to said front surface of said graded index lens; and
  a sensor single-mode optical fiber for transmitting said sensor light beam therethrough, said sensor single-mode optical fiber having:
    a tiny central core; and
    an output face out through which said sensor light beam is projected to said front surface of said graded index lens to mix with said reference light beam and said sensor light beam.

19. A sensor system using light as the sensing medium including:
  a reference light beam;
  a sensor light beam having the effect to be sensed impressed thereon in the form of phase changes, $\phi$, with respect to said reference light beam;
  means to mix said reference light beam and said sensor light beam into an interference pattern;
  first detector means positioned to have at least a portion of said interference pattern fall thereon;
  a first grating positioned optically between said means to mix said reference light beam and said sensor light beam into an interference pattern and said first detector means, said first grating being sized and aligned with respect to said interference pattern so that light from said interference pattern having an amplitude which is a function of sin $\phi$ falls on said first detector means;
  second detector means positioned to have at least a portion of said interference pattern fall thereon;
  third detector means positioned to have at least a portion of said interference pattern fall thereon;
  fourth detector means positioned to have at least a portion of said interference pattern fall thereon;
  a second grating positioned optically between said means to mix said reference light beam and said sensor light beam into an interference pattern and said second detector means, said second grating being sized and aligned with respect to said interference pattern so that light from said interference pattern having an amplitude which is a function of −sin $\phi$ falls on said second detector means;
  a third grating positioned optically between said means to mix said reference light beam and said sensor light beam into an interference pattern and said third detector means, said third grating being sized and aligned with respect to said interference pattern so that light from said interference pattern having an amplitude which is a function of cos $\phi$ falls on said third detector means;
  a fourth grating positioned optically between said means to mix said reference light beam and said sensor light beam into an interference pattern and said fourth detector means, said fourth grating being sized and aligned with respect to said interference pattern so that light from said interference pattern having an amplitude which is a function of −cos $\phi$ falls on said fourth detector means;
  a first optical fiber having:
    an input end; and
    an output end, said first grating being positioned on said input end thereof and said output end being positioned to transmit light passing through said first grating to said first detector means;
  a second optical fiber having:
    an input end; and
    an output end, said second grating being positioned on said input end thereof and said output end being positioned to transmit light passing through said second grating to said second detector means;
  a third optical fiber having:
    an input end; and
    an output end, said third grating being positioned on said input end thereof and said output end being positioned to transmit light passing through said third grating to said third detector means; and
  a fourth optical fiber having:
    an input end; and
    an output end, said fourth grating being positioned on said input end thereof and said output end being positioned to transmit light passing through said fourth grating to said fourth detector means.

20. The sensor system as defined in claim 19 further including:
  a quad detector having:
    a front light receiving face to which said first, second, third, and fourth optical fibers are connected, said quad detector having said first, second, third, and fourth detector means therebehind.

21. The sensor system as defined in claim 19 wherein said first, second, third, and fourth optical fibers are multi-mode fibers.

22. A sensor system using light as the sensing medium including:
a reference light beam;
a sensor light beam having the effect to be sensed impressed thereon in the form of phase changes, $\phi$, with respect to said reference light beam;
means to mix said reference light beam and said sensor light beam into an interference pattern;
first detector means positioned to have at least a portion of said interference pattern fall thereon; and
a first grating positioned optically between said means to mix said reference light beam and said sensor light beam into an interference pattern and said first detector means, said first grating being sized and aligned with respect to said interference pattern so that light from said interference pattern having an amplitude which is a function of sin $\phi$ falls on said first detector means, wherein said interference pattern is a pattern of alternate light and dark parallel stripes of predetermined width, said first grating including:
alternate opaque and transparent parallel strips orientated in a predetermined direction having widths essentially equal to said predetermined width of said alternate light and dark parallel stripes of said interference pattern, said first detector means including:
first and second light sensitive segments positioned so that portions of said interference pattern projects through said first grating thereon, said alternate light and dark parallel stripes of said interference pattern being canted a predetermined amount from said predetermined direction of said first grating strips so that said portion of said interference pattern falling on said first light sensitive segment of said first detector means is a function of sin $\phi$ and said portion of said interference pattern falling on said second light sensitive segment of said first detector means is a function of cos $\phi$.

23. The sensor system as defined in claim 22 further including:
a first optical fiber positioned to transmit light passing through said first grating to said first light sensitive segment; and
a second optical fiber positioned to transmit light passing through said first grating to said second light sensitive segment.

24. The sensor system as defined in claim 22 wherein said means to mix said reference light beam and said sensor light beam include:
a graded index lens having a pitch which is an odd number of quarter wavelengths of said reference beam, said graded index lens having:
a front surface; and
a back surface.

25. The sensor system as defined in claim 24 wherein said graded index lens back surface is positioned in contact with said first grating.

26. The sensor system as defined in claim 25 wherein said means to mix said reference light beam and said sensor light beam into an interference pattern include:
a reference optical fiber for transmitting said reference light beam therethrough, said reference optical fiber having:
an output face out through which said reference light beam is projected to said graded index lens; and
a sensor optical fiber for transmitting said sensor light beam therethrough, said sensor optical fiber having:
an output face out through which said sensor light beam is projected to said graded index lens to mix with said reference light beam and said sensor light beam, said reference light beam and said sensor light beam being projected from said output faces at locations on a predetermined line.

27. The sensor system as defined in claim 26 wherein said alternate opaque and transparent parallel strips of said first grating are canted said predetermined amount from perpendicular to said predetermined line.

28. The sensor system as defined in claim 26 wherein said means to mix said reference light beam and said sensor light beam further include:
a ferrule maintaining said output faces of said reference and sensor optical fibers on said predetermined line so that said reference and sensor beams project out therefrom with a predetermined spaced relationship to establish said interference pattern.

29. The sensor system as defined in claim 22 wherein said first light sensitive segment produces an electrical output which is C(K+sin $\phi$) where C and K are constants and said second light sensitive segment detector means produces an electrical output which is C(K+cos $\phi$).

30. The sensor system as defined in claim 29 further including:
electronic demodulator means connected to receive said C(K+sin $\phi$) and C(K+cos $\phi$) signals from said first and second light sensitive segments and to produce therefrom an electrical output signal $\phi$.

31. The sensor system as defined in claim 22 further including:
a first optical fiber having:
an input end; and
an output end, said first grating being positioned on said first optical fiber input end and said first optical fiber output end being positioned to transmit light passing through said first grating to said first light sensitive segment of said first detector means; and
a second optical fiber having:
an input end; and
an output end, said first grating being positioned on said second optical fiber input end and said second optical fiber output end being positioned to transmit light passing through said first grating to said second light sensitive segment of said first detector means.

32. A sensor system using light as the sensing medium including:
a reference light beam;
a sensor light beam having the effect to be sensed impressed thereon in the form of phase changes, $\phi$, with respect to said reference light beam;
means to mix said reference light beam and said sensor light beam into an interference pattern;
first detector means positioned to have at least a portion of said interference pattern fall thereon; and
a first grating positioned optically between said means to mix said reference light beam and said sensor light beam into an interference pattern and said first detector means, said first grating being sized and aligned with respect to said interference pattern so that light from said interference pattern having an amplitude which is a function of sin $\phi$ falls on said first detector means, wherein said interference pattern is a pattern of alternate light and dark parallel stripes of predetermined width, said first grating including:
- a first portion having alternate opaque and transparent first parallel strips orientated in a predetermined direction having widths essentially equal to said predetermined width of said alternate light and dark parallel stripes of said interference pattern; and
- a second portion having alternate opaque and transparent parallel second strips orientated in said predetermined direction having widths essentially equal to said predetermined width of said alternate light and dark parallel stripes of said interference pattern and being positioned adjacent said first portion so that a light stripe of said interference pattern falling on a opaque first strip, also falls on a transparent second strip.

33. The sensor system as defined in claim 32 wherein said opaque first strips extend to said transparent second strips and said opaque second strips extend to said transparent first strips whereby a opaque area is formed between said first and second portions.

34. The sensor system as defined in claim 32 wherein said first grating further includes:
- a third portion having alternate opaque and transparent third parallel strips orientated in a predetermined direction having widths essentially equal to said predetermined width of said alternate light and dark parallel stripes of said interference pattern;
- a fourth portion having alternate opaque and transparent parallel fourth strips orientated in said predetermined direction having widths essentially equal to said predetermined width of said alternate light and dark parallel stripes of said interference pattern and being positioned adjacent said first portion so that a light stripe of said interference pattern falling on a opaque third strip, also falls on a transparent fourth strip while another light stripe of said interference pattern falls half on a opaque first strip and half on a transparent first strip.

35. The sensor system as defined in claim 34 wherein said opaque first strips extend to said transparent second strips and said opaque second strips extend to said transparent first strips and wherein said opaque third strips extend to said transparent fourth strips and said opaque fourth strips extend to said transparent third strips whereby a opaque area is formed between said first and second portions and between said third and fourth portions.

36. The sensor system as defined in claim 32 further including:
- a light source which produces a light beam of predetermiend coherence;
- first beamsplitter means which split said light beam of predetermined coherence into said reference light beam and a sensor input light beam; and
- means to impress the effect to be sensed on said sensor input light beam in the form of phase changes, $\phi$, thereof with respect to said reference light beam to generate said sensor light beam, said first beamsplitter means including:
- a fiber optic coupler having:
    - an input connected to said light source;
    - a first output out of which said reference light beam is produced; and
    - a second output out of which said sensor input light beam is produced, said reference light beam and said sensor input light beam being essentially identical.

37. The sensor system as defined in claim 32 further including:
- a light source which produces a light beam of predetermined coherence;
- first beamsplitter means which split said light beam of predetermined coherence into said reference light beam and a sensor input light beam; and
- means to impress the effect to be sensed on said sensor input light beam in the form of phase changes, $\phi$, thereof with respect to said reference light beam to generate said sensor light beam including:
    - an isonified optical fiber connected between said second output of said fiber optic coupler and said means to mix said reference light beam and said sensor light beam into an interference pattern.

* * * * *

UNITED STATES PATENT AND TRADEMARK OFFICE
CERTIFICATE OF CORRECTION

PATENT NO. : 4,668,093
DATED : May 26, 1987
INVENTOR(S) : Richard F. Cahill

It is certified that error appears in the above-identified patent and that said Letters Patent is hereby corrected as shown below:

In column 3, line 63, the word [havin9] should be having.

In column 9, line 24, the word [saidmeans] should be said means.

In column 10, line 43, the word [K + cos 100] should be K + cos ϕ.

Signed and Sealed this

Thirty-first Day of January, 1989

Attest:

DONALD J. QUIGG

Attesting Officer

Commissioner of Patents and Trademarks